United States Patent Office 3,260,694
Patented July 12, 1966

3,260,694
CROSS-LINKED CHLORINATED POLYETHYLENE
Leopold T. Wang, New York, N.Y., assignor to Phelps Dodge Copper Products Corporation, New York, N.Y., a corporation of Delaware
No Drawing. Filed Jan. 9, 1962, Ser. No. 165,224
14 Claims. (Cl. 260—41)

This invention relates to novel thermosetting halogenated polyethylenes and a process for preparing same. Chlorinated polyethylene polymers possess excellent electrical insulation properties, however, in the past these polymers have failed to attain appreciable acceptance as electrical insulation material due to inferior mechanical properties. For example, high molecular weight chlorinated polyethylene polymer is stiff and brittle, while the low molecular weight form has poor tensile strength and deforms readily at room temperature.

By this invention halogenated polyethylene may be cross-linked to yield in the case where a high and low molecular weight variant of the halogenated polyethylene is cross-linked, a polymeric material having excellent electrical and mechanical properties. The relative amounts of the high and low molecular weight components may be altered over a wide range to provide a final polymer having a varying degree of flexibility. The invention is likewise useful in preparing polymers of cross-linked low molecular weight components, per se and similarly cross-linked polymers of high molecular weight halogenated polyethylenes.

The process of this invention broadly comprises reacting a halogenated polyethylene in the presence of a cross-linking agent. Of special interest from the standpoint of preparing a useful electrical insulation material is the cross-linking of a high and low molecular weight variant of a halogenated polyethylene. The reaction is believed to proceed according to the following sequence of reaction steps using dicumyl peroxide as illustrative of the cross-linking agents.

(a)
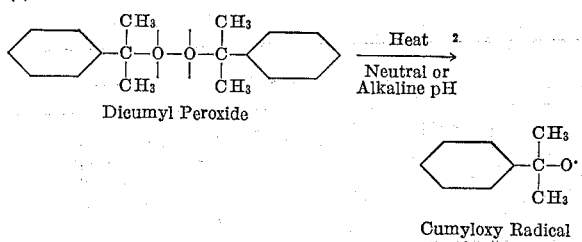
Dicumyl Peroxide

Cumyloxy Radical (b)
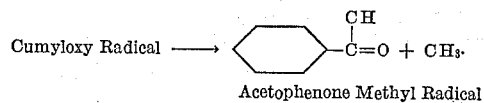
Acetophenone Methyl Radical (c)
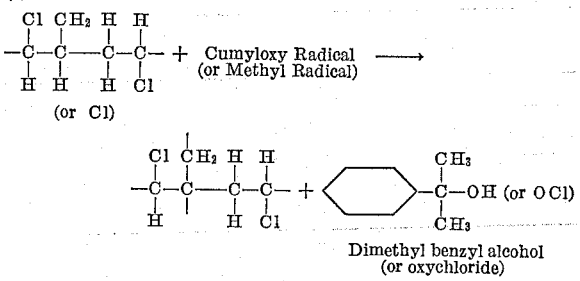
Dimethyl benzyl alcohol (or oxychloride)

(d) Crosslinking
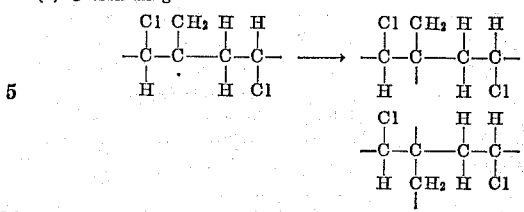

For purposes of this disclosure, the term "high molecular weight" is meant to include halogenated polyethylenes having a molecular weight greater than 35,000 and "low molecular weight" to include halogenated polyethylenes having a molecular weight below 20,000.

To achieve compositions useful as electrical insulation material, it has been found that the high molecular weight variant may be present in an amount from 30 to 90% by weight of total halopolyethylene and the low molecular variant from 10 to 70% of the total halopolyethylene added. Preferred range is 15–45% of low molecular weight variant.

The invention is exemplified by reference to chlorinated polyethylene. However, it is to be understood that fluorinated, brominated and iodated polyethylenes may likewise be cross-linked. Fluorinated polyethylenes under conditions similar to those in the case of chlorinated polyethylene, whereas brominated and iodated polyethylenes require higher reaction temperatures.

I have not found there to be a limitation on the halogen content of the polyethylene and have found, in the case of chlorine, that a chlorine content of 20–50% by weight of the variant is preferred.

Additionally, fillers such as alkaline or neutral carbon blacks, clays, and whitings may be added. The filler material is believed to impart additional strength characteristics to the polymer due to the formation of chemical bonds between the polymer and filler. The filler may be present in an amount of 15–100 parts per 100 parts of halogenated polyethylene. Preferred amounts are from 30–80 parts. Calcined clays such as Whitetex or Harwick #12 have given best results but fillers such as zinc oxide, whitings, magnesium hydroxides and silicas are satisfactory.

Organic peroxides may be used as the agents to cross-link the high and low molecular weight halopolyethylenes. Typical of the peroxides are dicumyl peroxide, dietertiary butyl peroxide, perbenzoates, perphthalates, 2,5-dimethyl-2,5-di (t-butyl peroxy hexane). Generally, organic peroxides that are sufficiently stable to withstand blending temperatures of the reaction components are satisfactory. The amount of organic peroxide may be varied from 1.5 to 6% by weight of the total composition.

The addition of amine or aminetype accelerators has been found to promote the cross-linking reaction; this is particularly the case where acidic types of fillers, such as, silica and acidic clays are used. The number of cross-links per unit of polyethylene chain length is a factor of the amount of peroxide and the time and temperature of the reaction. Generally, each of these factors independently operates to increase the number of crosslinks per unit molecule as the factor is increased and likewise when operating in concert produces a greater cross-linking.

Typical of the amine or aminetype accelerators are guanidine, di and tri aliphatic and aromatic amines, urea, thioureas, and derivatives of said compounds. The accelerators are generally added in the blending step in an amount of 0.2–2% by weight of the total composition.

The cross-linking reaction may be conducted at temperatures between about 260–450° F. For molded articles, a temperature of 300–360° F. is preferred and a platen pressure of 500 p.s.i. or above. For continuous cross-linking, such as, for example, in forming a thin wire coating, the reaction may be conducted in live steam at a temperature of 380°–450° F. at steam pressures of 180–300 p.s.i.

The cross-linking rate is a function of temperature, type of curing agent, type of filler, and size and shape of the cured article. For example, the curing cycle may range from 25 seconds in live steam at 300 p.s.i. (422° F.) for a wire coating having a wall thickness of 1/32" using a dicumyl peroxide as the curing agent to 3½ hours for a one inch thick slab in a molding press at 300° F.–500 p.s.i., wherein the molding powder is clay filled and tertiary butyl peroxide is the curing agent.

EXAMPLE I 70 parts of a chlorinated polyethylene (X-Cl—Allied Chemical Co.) having an estimated average molecular weight of 35,000 and above and a chlorine content of about 40–45% and 30 parts of a chlorinated polyethylene (LD–184—Du Pont) having an estimated average molecular weight of less than 20,000 and a chlorine content of about 37% were blended on a plastic mill at 110° C. for 10 minutes. After blending the materials into a plastic mass of a dough-like consistency, the temperature of the mill was lowered to 105° C. and 4.5 parts of Di-Cup 40–C (40% dicumyl peroxide and 60% of neutral inert clay) were dispersed into the plastic mass over a period of 3 minutes. Subsequently, the mass was stripped from the mill, cut into appropriately sized squares and cross-linked in a hydraulic press at 356° F. for 15 minutes using 2000 p.s.i. platen pressure. The resulting sheets showed greater flexibility than a blank high molecular weight non-cross-linked material.

Specimens from the above cross-linked material were tested for the degree of cross-linking. The degree of cross-linking was determined by (1) the amount of swelling in boiling trichloroethylene and (2) high temperature tension deformation test, wherein the specimens were subjected to a load of 40 lbs./in.$^2$ at 140° C. for 3 minutes and the final elongation of a ¼" x 0.060" specimen measured upon cooling. The results showed that high molecular weight non-cross-linked material dissolved completely in the solvent in 30 minutes while the cross-linked polymer swelled 45% in 6 hours. Under the conditions of the tension test, the non-cross-linked specimen became a viscous liquid while the cross-linked material elongated only 33%. Elongation at break was 65% for the cross-linked material, whereas it was only 5–10% for the non-cross-linked sample. This difference in elongation clearly demonstrates that the cross-linked material has a substantially greater flexibility than the non-cross-linked material.

EXAMPLE II 42 parts of a chlorinated polyethylene (X-Cl—Allied Chemical Co.) having an average molecular weight of over 38,000, a chlorine content of 40–45%, 18 parts of a chlorinated polyethylene (LD–184—Du Pont) having an average molecular weight of less than 20,000, a chlorine content of 37 and 40 parts of Harwick #12 clay were mixed on a plastic mill in the manner described in Example I. 4.5 parts of Di-Cup 40–C were added to the mix and the resulting material was processed and cross-linked in the same way as samples of Example I. The test results showed that the material was cross-linked. Swelling in boiling trichloroethylene was 20% in 6 hours, while elongation at 140° C. under a load of 40 lbs. was 10%. The non-cross-linked material of the same composition dissolved in trichloroethylene and melted under the high temperature-load tension test. Compared with a non-cross-linked blend of the same composition, the cross-linked material showed an ultimate elongation at break of 45%, as compared to 5%.

The results of the tests described in the examples established that the cross-linking reaction occurred and further that the resulting polymer is more flexible than a comparative composition which has not been cross-linked.

Table I shows various samples of cross-linked chloropolyethylenes and their properties.

*Table 1*

| Ingredient | A | B | C | D | E | F | G |
|---|---|---|---|---|---|---|---|
| LD–184 | 32 | 10 | 30 | 70 | | 40 | 30 |
| X-CL | 32 | 50 | 50 | 30 | 100 | 40 | 70 |
| Di-Cup 40–C | 4.5 | | | | | | 4.5 |
| Lupersol 101 | | 2.2 | 5 | 2.2 | 4.5 | 2.4 | |
| Whitetex (Clay) | 32 | 40 | | | | 10 | |
| Hi Sil-233 (Silica) | | | 20 | | | 10 | |
| Guanadine | | | 0.8 | | | 0.5 | |

CURED IN A MOLDING PRESS AT 330° F. FOR 15 MINUTES

| Properties | A | B | C | D | E | F | G |
|---|---|---|---|---|---|---|---|
| Tensile Strength (p.s.i.) | 2,450 | 5,100 | 3,300 | 680 | 7,715 | 2,280 | 2,800 |
| Percent Elongation Break | 100 | 20 | 48 | 250 | 5 | 70 | 65 |

48 HOURS' AIR OVEN AGING

| | A | B | C | D | E | F | G |
|---|---|---|---|---|---|---|---|
| Tensile Strength (p.s.i.) | 3,150 | 5,500 | 4,140 | 590 | 8,310 | 2,400 | 3,400 |
| Percent Elongation Break | 45 | 14 | 40 | 250 | 0 | 120 | 90 |
| Percent Elongation Under 40 p.s.i. Load at 140° C. | 42 | 16 | 24 | 100 | 15 | 38 | 22 |

ELECTRICAL PROPERTIES

| | A | B | C | D | E | F | G |
|---|---|---|---|---|---|---|---|
| 1 Day SIC Room Temp | 4.6 | 2.7 | 2.9 | 2.6 | 2.62 | 4.20 | 3.15 |
| 1 Day Percent PF Room Temp | 2.05 | 0.98 | 1.16 | 0.92 | 1.95 | 1.88 | 1.06 |
| Resistivity, Ohm-cm | ∞ | ∞ | ∞ | NR | 80×10$^{14}$ | ∞ | ×10$^{15}$ |
| Percent Loss of Weight After 6 Hours in Boiling Trichloroethylene | 48 | 22 | 28 | 56 | 32 | 39 | 31 |

As stated above, the compositions of this invention are useful as electrical insulation material. The application of the pre-cross-linked compositions of this invention to molding and laminating techniques used in the electrical insulation art is understood by those skilled in said art in the light of the above specification and need not be elaborated upon herein. Suffice it to say that conventional techniques may be employed.

I claim:

1. A curable halogenated polyethylene composition comprising a high molecular weight halogenated polyethylene having a molecular weight of at least 35,000, a low molecular weight halogenated polyethylene having a molecular weight no greater than 20,000, and a catalytic amount of a cross-linking agent for said halogenated polyethylenes wherein the ratio of high molecular weight halogenated polyethylene to low molecular weight halogenated polyethylene is between 30:70 to 90:10.

2. The composition of claim 1, wherein the halogenated polyethylene is a chlorinated polyethylene.

3. The composition of claim 1, wherein the cross-linking agent is an organic peroxide.

4. The composition of claim 2, wherein the cross-linking agent is an organic peroxide.

5. The composition of claim 1, wherein a filler material is added in an amount between 15 to 100 parts per 100 parts of halogenated polyethylene.

6. The composition of claim 5, wherein the filler material is acidic.

7. The composition of claim 6, wherein there is added an amine accelerator in an amount of 0.2 to 2.0% by weight of the total composition.

8. A thermosetting polymeric composition comprising the cross-linked reaction product of a high molecular weight halogenated polyethylene having a molecular weight of at least 35,000 and a low molecular weight halogenated polyethylene wherein the ratio of high molecular weight halogenated polyethylene to low molecular weight halogenated polyethylene is between 30:70 to 90:10 having a molecular weight no greater than 20,000.

9. The composition of claim 8, wherein the halogenated polyethylene is a chlorinated polyethylene.

10. The composition of claim 8, wherein a filler material is present in an amount between 15 to 100 parts per 100 parts of halogenated polyethylene.

11. The process of cross-linking a high molecular weight and a low molecular weight halogenated polyethylene polymers wherein the high molecular weight polyethylene has a molecular weight of at least 35,000, and the low molecular weight polyethylene has a molecular weight no greater than 20,000, comprising admixing the high and low molecular weight halogenated polyethylene polymers in a ratio of high molecular weight polyethylene to low molecular weight polyethylene between 30:70 to 90:10 and an organic peroxide and subjecting the admixture to elevated temperatures and pressures for a period of time sufficient to cross-link the polymers.

12. The process of claim 11, wherein the admixture is subjected to a temperature of 300–360° F. and a pressure of at least 500 p.s.i. for a period of time sufficient to cross-link the polymers.

13. The process of claim 11, wherein the admixture is subjected in the presence of live steam to a temperature of 380°–450° F. and a steam pressure of 180–300 p.s.i. for a period of time sufficient to cross-link the polymer.

14. The process of claim 11, wherein an acidic filler material is present in the admixture and wherein an amine accelerator is present in an amount of 0.2 to 2.0% by weight of the total composition.

References Cited by the Examiner

UNITED STATES PATENTS

| | | |
|---|---|---|
| 2,268,162 | 12/1941 | Myles et al. |
| 2,534,078 | 12/1950 | Strain. |
| 2,888,424 | 5/1959 | Precopio et al. |
| 3,110,709 | 11/1963 | Canterino _____ 260—94.97 |

FOREIGN PATENTS

| | | |
|---|---|---|
| 478,142 | 10/1951 | Canada. |
| 613,203 | 1/1961 | Canada. |
| 567,214 | 10/1957 | Italy. |

MORRIS LIEBMAN, *Primary Examiner.*

LEON J. BERCOVITZ, *Examiner.*

K. B. CLARKE, J. S. WALDRON, *Assistant Examiners.*

UNITED STATES PATENT OFFICE
CERTIFICATE OF CORRECTION

Patent No 3,260,694                                     July 12, 1966

Leopold T. Wang

It is hereby certified that error appears in the above numbered patent requiring correction and that the said Letters Patent should read as corrected below.

Column 5, line 37, after "polyethylene" insert -- having a molecular weight no greater than 20,000 --; line 40, for "90:10" read -- 90:10. --; same line 40, strike out "having a molecular weight no greater than 20,000 --.

Signed and sealed this 26th day of September 1967.

(SEAL)
Attest:

ERNEST W. SWIDER                                    EDWARD J. BRENNER
Attesting Officer                                           Commissioner of Patents